US008780730B2

(12) United States Patent
Thota et al.

(10) Patent No.: US 8,780,730 B2
(45) Date of Patent: Jul. 15, 2014

(54) LOAD-BALANCING GATEWAYS

(75) Inventors: Saigopal Thota, Davis, CA (US);
Sudhir Dixit, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 318 days.

(21) Appl. No.: 13/098,491

(22) Filed: May 2, 2011

(65) Prior Publication Data
US 2012/0230201 A1    Sep. 13, 2012

(30) Foreign Application Priority Data

Mar. 12, 2011   (IN) .............................. 754/CHE/2011

(51) Int. Cl.
*G01R 31/08*   (2006.01)

(52) U.S. Cl.
USPC ............................ 370/241; 370/238; 370/338

(58) Field of Classification Search
None
See application file for complete search history.

(56) References Cited

U.S. PATENT DOCUMENTS

| 7,177,295 | B1 |   | 2/2007  | Sholander et al. |
|-----------|----|---|---------|------------------|
| 2004/0068668 | A1 | * | 4/2004  | Lor et al. ...................... 713/201 |
| 2004/0229621 | A1 | * | 11/2004 | Misra ............................ 455/445 |
| 2007/0076673 | A1 |   | 4/2007  | Joshi |
| 2008/0069006 | A1 | * | 3/2008  | Walter et al. .................. 370/252 |
| 2008/0104273 | A1 | * | 5/2008  | Bruck et al. .................. 709/238 |
| 2008/0112326 | A1 |   | 5/2008  | Krishnakumar et al. |
| 2010/0211637 | A1 | * | 8/2010  | Borzsei et al. ................ 709/204 |
| 2011/0058541 | A1 | * | 3/2011  | Fok et al. ..................... 370/338 |

OTHER PUBLICATIONS

Ehsan Pourfakhar et al., "A Hybrid QoS Multicast Framework-based Protocol for Wireless Mesh Networks," http://portal.acm.org/citation.cfm?id=1864807.1864880&coll=DL&dl=GUIDE&CFID=8214301&CFTOKEN=69078181 >Publication Date: Nov. 2010; vol. 33; on pp. 2079-2092.

Quan Le-Trung et al., "Load-balance of Intra/inter-MANET Traffic Over Multiple Internet Gateways," http://folk.uio.no/paalee/publications/xa-letrung-momm-2008.pdf > PublicationDate: Nov. 24-26, 2008.

Vinh Dien Hoang et al., "Multi-paths Routing with Load Balancing for Internet Access in Wireless Mesh Networks," http://airccse.org/journal/jwmn/0210s5.pdf> Publication Date:Feb. 2010;vol. 2; on pp. 55-75.

* cited by examiner

*Primary Examiner* — David Oveissi

(57) ABSTRACT

A gateway system determines whether load conditions are heavy or light according to a predetermined criterion. If load conditions are light, the gateway operates in reactive mode. If load conditions are heavy, the gateway operates in proactive mode.

15 Claims, 4 Drawing Sheets

LOAD-BALANCING GATEWAYS

RELATED APPLICATION

Benefit is claimed under 35 U.S.C. 119(a)-(d) to Foreign application Serial No. 754/CHE/2011, filed in INDIA entitled "LOAD-BALANCING GATEWAYS" by Hewlett-Packard Development Company, L.P., filed on Mar. 12, 2011, which is herein incorporated in its entirety by reference for all purposes.

BACKGROUND

Load balancing can improve performance by diverting traffic to a lightly used gateway and away from a more heavily used gateway that might otherwise become congested. Load balancing is particularly helpful in resource-constrained systems, e.g., wireless systems that may be constrained in terms of bandwidth, power, and signal strength. However, there is a challenge of achieving effective load balancing without excessive offsetting of the gains due to the extra bandwidth and resources consumed by the load-balancing itself.

BRIEF DESCRIPTION OF THE DRAWINGS

The following figures represent examples or implementations of the invention and not the invention itself.

DETAILED DESCRIPTION

Figure 1:
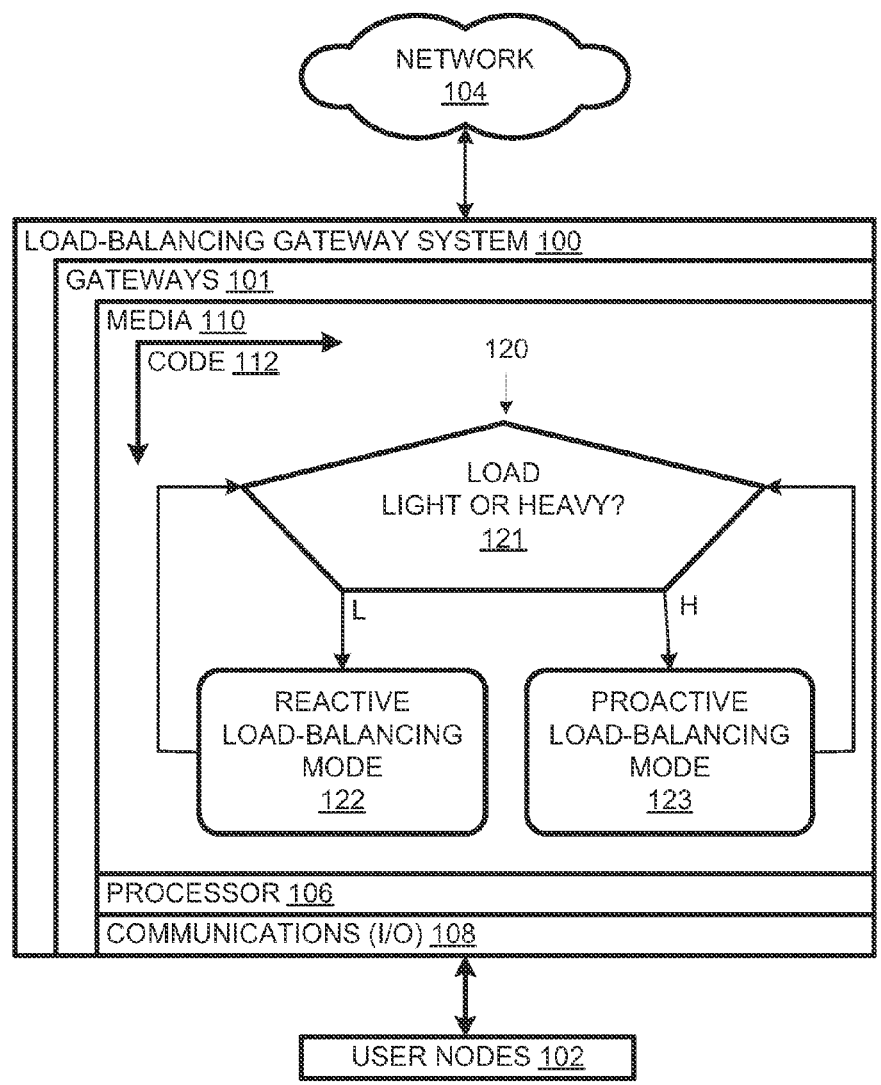
FIG. 1 is a schematic diagram of a load-balancing gateway system in accordance with an example.

A load-balancing gateway system 100, shown in FIG. 1, operates in a reactive load-balancing mode under light-load conditions to save power and in a proactive load-balancing mode under heavy-load conditions to reduce gateway congestion. Load-balancing gateway system 100 includes a processor 106, communications (including input/output) devices 108, and computer-readable storage media 110. Media 110 is encoded with code 112 that, when executed by processor 106, causes a process 120 to be implemented. At 121, system 100 determines whether load conditions are light or heavy. If they are light, system 100 operates in a reactive load-balancing mode at 122. If they are heavy, system 100 operates in a proactive load-balancing mode at 123. Process 120 can be iterated so that the load-balancing mode is updated to match current load conditions.

Herein, in "reactive mode" load-balancing decisions are made in response a request for network access from a user node. Herein, in "proactive mode" a gateway broadcasts (e.g., periodically) gateway status data to user nodes so that the user nodes can make load-balancing decisions. Herein, complementary use of the terms "heavy" and "light" implies an objective criterion for distinguishing heavy from light. Exemplary criteria are explained with reference to the example of FIG. 2.

Figure 2:
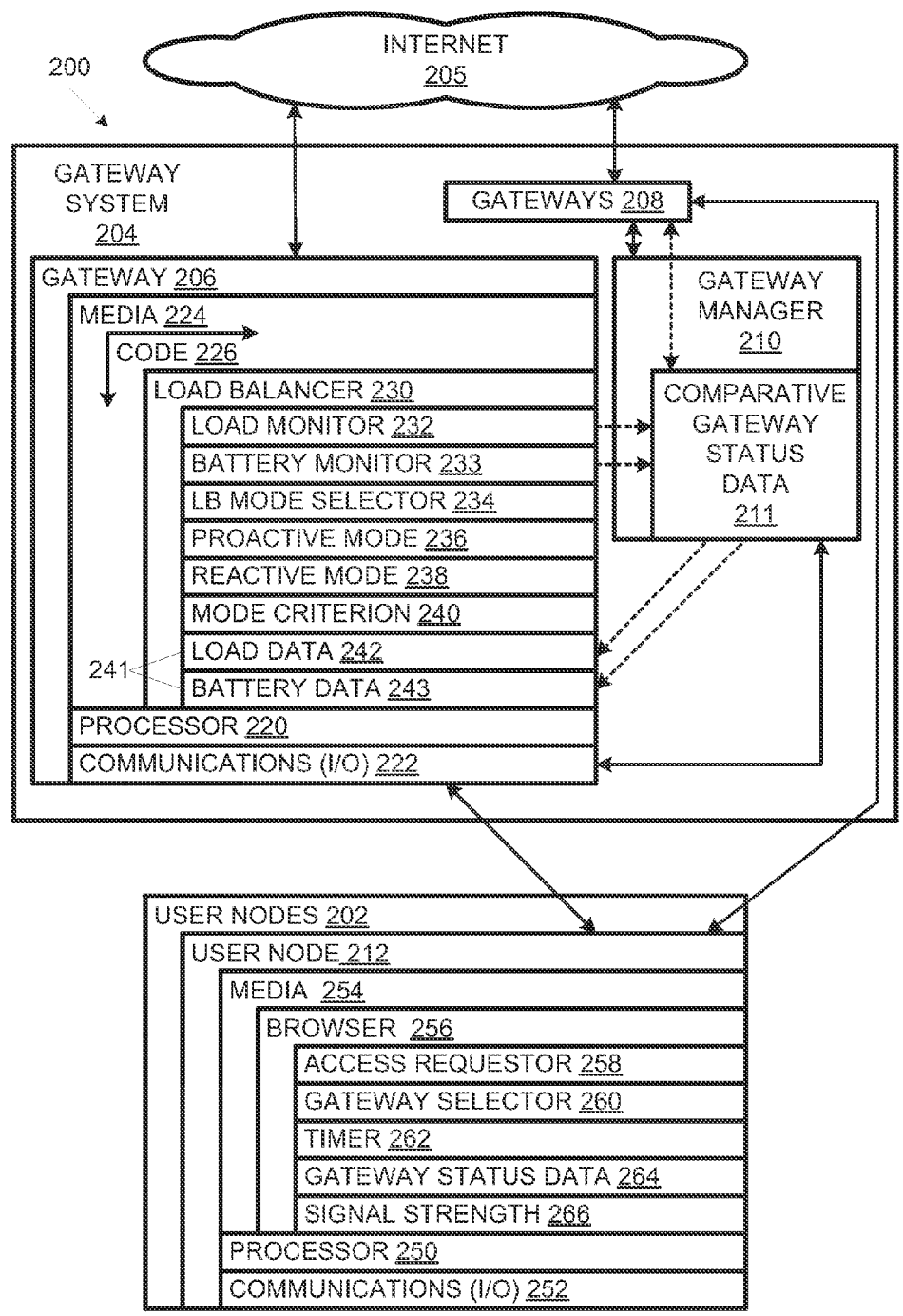
FIG. 2 is a schematic diagram of a network system including a load-balancing system in accordance with an example.

Communications system 200, shown in FIG. 2, consists of user nodes 202 and a gateway system 204 that provides nodes 202 access to the Internet 205. Nodes 202 may include cellular (including voice and data) and other wireless-technology network devices including cell phones, Internet tablets, wireless data cards, and wireless infrastructure devices. Gateway system 204 includes gateways 206 and 208 and a gateway manager 210.

Gateways 206 and 208 can be in the form of cell towers that are powered by batteries, which, in turn, are charged using solar cells. Gateways 206 and 208 may be connected to the Internet by a backhaul system with battery-power or other resource constraints. Gateway system 204 is well-suited for rural and developing environments that may lack a power infrastructure to provide utility power to cell towers. Load balancing in gateway system 204 is used not only to maintain performance (by using proactive mode under heavy-load conditions), but to reduce the risk of an overused gateway running out of power (by using reactive mode under light-load conditions). In other examples, some or all gateways are powered by utility power rather than or in addition to batteries.

Gateway 206, which is representative of gateways 208, includes a processor 220, communications (including input/output) devices 222, and computer-readable storage media 224. Media 224 is encoded with code 226 defining a load balancer 230. Load-balancer 230 includes a load monitor 232, a battery monitor 233, a load-balancing mode selector 234, a proactive mode manager 236, a reactive load-balancing mode manager 238, a mode criterion 240, and comparative gateway status data 241. Comparative gateway status data 241 includes comparative load data 242, and comparative battery data 243.

Gateway status data 241 includes, not only data obtained locally by load monitor 232 and battery monitor 233, but also counterpart data from other gateways 208. To this end, gateways 206 and 208 communicate their own load and battery data to gateway manager 210. Gateway manager 210 compiles the load and battery data received from gateways 206 and 208, and distributes the resulting gateway status data 211 to gateways 206 and 208 to yield comparative gateway data 241. Thus, each gateway 206, 208 has load and battery data for all gateways in gateway system 204.

Mode criterion 240 can be based on load conditions and/or battery status. Load conditions can be expressed according to various parameters such as: absolute available bandwidth, available bandwidth relative to capacity, response time, number of active user nodes using a gateway, and frequency of dropped connections. Battery status can be expressed according to various parameters such as: remaining power, remaining power relative to capacity, estimated time remaining, and estimated time to recharge (which may vary according to solar cell capacity, weather, and other factors).

Mode criterion 240 can take other factors into account, e.g., gateway performance, time-of-day, time-of-year, weather conditions, etc. In particular, criterion 240 may take into account the reachability of other gateways. For example, a gateway may ignore gateway status data from a gateway that it cannot "reach" (communicate with directly). Mode criterion 240 can employ hysteresis to limit switching back and forth between modes; for example, the load threshold for switching to proactive mode can be higher than the load threshold for switching to reactive mode. Alternatively, mode criterion 240 can set a minimum duration for a mode before switching back to the previous mode.

In reactive mode, gateway 206 selects a candidate access gateway based on comparative gateway status data 241. In proactive mode, gateway 206 periodically broadcasts messages including the most recent version of comparative gateway status data 241.

User node 212, which is representative of nodes 202, includes a processor 250, communications (including input/output) devices 252, and computer-readable storage media

254. Media 254 is encoded with code defining a browser 256. Browser 256 includes an access requestor 258 for requesting internet access, a gateway selector 260, a timer 262, comparative gateway status data 264, and signal-strength indications 266. Comparative gateway status data 264 corresponds to comparative gateway status data received from one or more gateways, e.g., comparative status data 241 from gateway 206.

Figure 3:
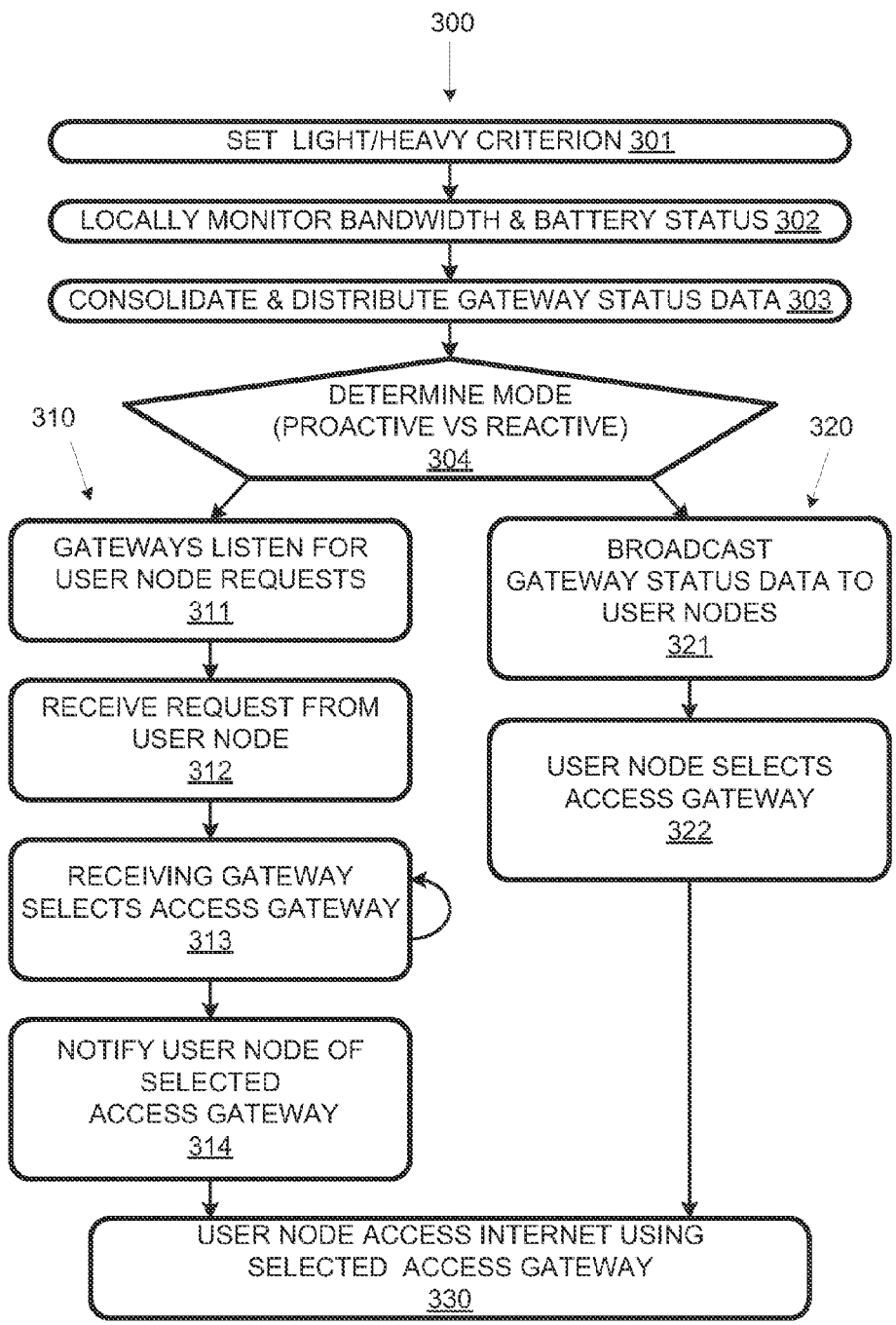
FIG. 3 is a flow chart of a load-balancing process implemented in the system of FIG. 2.

Gateway system 204 implements a process 300, shown in FIG. 3. At 301, light/heavy criterion 240 is set to distinguish light and heavy load conditions. Criterion 240 may be programmed by an administrator and/or adjusted dynamically according to some performance parameter. In gateway system 204, all gateways 206 and 208 use the same criterion, but do so independently so gateways 206 and 208 may be in different load-balancing modes at any given time. In an alternative example, the criterion is an aggregate criterion based on gateway status data from all gateways; in this example, load-balancing modes are synchronized.

At 302, each gateway 206, 208, monitors its local load parameter or parameters to obtain a measure of each gateway's availability to handle requests for Internet access. Also, at 302, each gateway 206, 208 monitors battery status. At 303, the resulting gateway status data (including load and battery status data) is transmitted (unicast) to gateway manager 210. In gateway system 204, the frequency with which a gateway transmits its status data depends on load conditions: more frequent transmissions are used under heavy load conditions and under conditions in which the load changes rapidly.

At 303, gateway manager 210 consolidates the gateway status data received to yield comparative gateway status data 211. Also at 303, gateway manager 210 distributes comparative gateway status 211 to gateways 206 and 208, e.g., to update a priority table including load status data 242 and battery status data 243. Typically, the priority tables of the gateways in a network cluster are synchronized within some tolerance. In an alternative example, the gateways communicate gateway status data with each other directly (without an intermediate gateway manager) and consolidate data locally.

At 304, each gateway 206, 208 assumes (either switches to or maintains) the load-balancing mode called for by criterion 240 as applied to the local gateway status data 241. In an alternative example, load-balancing modes are synchronized among gateways, e.g., a gateway manager dictates load-balancing mode based on consolidated gateway status data. In another alternative example, communicate with each other (using either single-hop or multi-hop through intermediate gateways communications) to synchronize load-balancing modes.

At 305, each gateway applies its load-balancing criterion to its comparative gateway status data to determine its load-balancing mode. If the gateway status data indicates that load conditions are light, then reactive mode 310 is entered. At 311, the gateway listens for user node requests (while process segments 302-304 are ongoing).

At 312, a "receiving" gateway, e.g., gateway 206, receives a quest for Internet access from a user node, e.g., user node 212. In response, receiving gateway 206 selects an "access" gateway at 313. The access gateway may be the receiving gateway or another gateway selected on the basis of gateway status data received from gateway manager 210. The receiving gateway can send a flow request to the selected access gateway for it to reserve bandwidth for the requesting node. If the access gateway declines the request, the receiving gateway can select another access gateway (until one accepts). Once an access gateway has reserved bandwidth for the requesting user node, at 314, the receiving gateway notifies the requesting user node of the selected access gateway. At 330, the requesting user node accesses the Internet using the selected access gateway.

If the gateway status data indicates that the load is heavy, the proactive load-balancing mode 320 is assumed at 305. In proactive mode, at 321, gateway 206 (for example) periodically broadcasts gateway status messages to user nodes 202 so as to update gateway status data 264 (for example). Each gateway in proactive mode broadcasts gateway status messages, e.g., one every few seconds per user node, so that a user node may receive gateway status messages from plural gateways.

Due to the consolidation by gateway manager 210, the messages from different gateways will provide the same comparative gateway status data except that the status data in more recent messages can be more current. Accordingly, a user node 212 can simply use the most-recently received gateway status data in selecting an access node.

At 322, gateway selector 260 selects an access gateway based on gateway status data 264 and the respective signal strengths associated with gateways 206 and 208. All else being equal, a user node would select the gateway for which the greatest signal strength is measured at the user node. However, system-wide considerations may favor another gateway, as indicated by gateway status data 264. At 330, the user node accesses the Internet using the selected access gateway.

Figure 4:
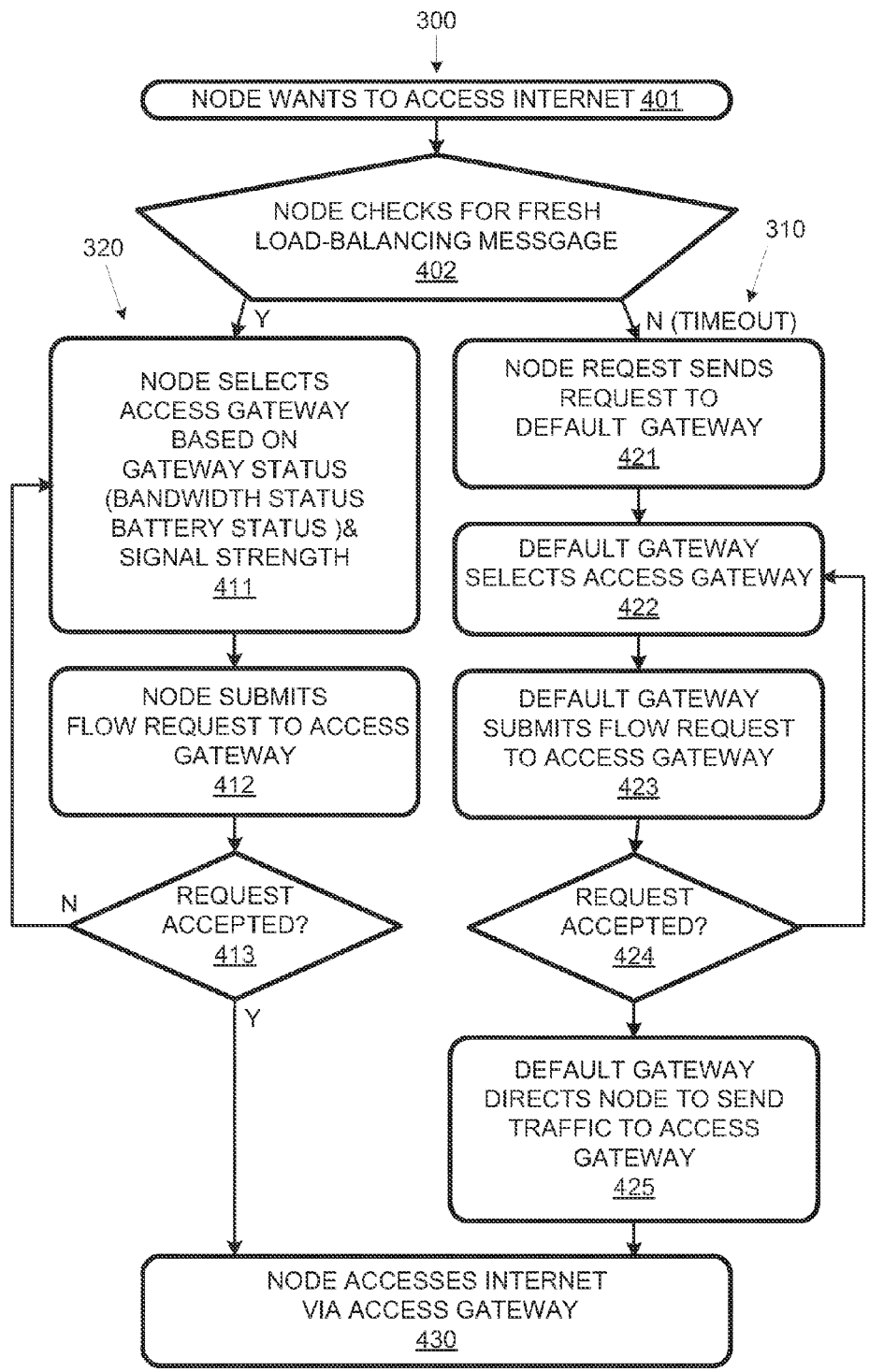
FIG. 4 is a flow chart of the process of FIG. 3 from another perspective.

Process 300 can be viewed from a gateway perspective, as it is in FIG. 3, and from a user-node perspective, as it is in FIG. 4. At 401, user node 212 desires to access the Internet, e.g., in response to a user command. At 402, user node 212 checks for a "fresh" gateway status message. This checking can involve determining how recently the latest received gateway status message, if any, was received; messages older than some duration, e.g., ten seconds, are ignored or discarded. The checking can also involve waiting some period of time (e.g., a few seconds) for a new gateway status message to be received.

If there is a fresh gateway-status message, at 411, gateway selector 260 of node 212 selects an access gateway based on the load and battery status data 264 in the message and the relative signal strengths of the gateways at node 212. Even though some gateways may be in proactive mode, others may not be. In that case, the gateway status data will tend to favor selection of a (lightly loaded) gateway in reactive mode over a (more heavily loaded) gateway in proactive mode.

At 412, user node 212 submits a flow request to the selected access gateway. At 413, user node 212 determines from a reply whether the request was or was not accepted. If it was not accepted, user node 212 selects another access gateway based on the gateway status data (which may have been updated in the interim). A gateway may reject a flow request if its load has become heavy since the time reflected in the gateway status data used by the user node. Once a selected access gateway accepts a flow request, node 212 can access the Internet via the access gateway at 430.

In general, the check at 402 will fail when all reachable gateways are in reactive mode, indicating light load conditions through system 204. If at 402, the check fails to find a fresh gateway status message, e.g., after a time-out period lapses, node 212 sends a request to a default gateway. For user node 212, the default gateway is the one with the strongest signal strength as measured at user node 212. For some (e.g., non-mobile nodes), the default gateway can be pre-assigned.

At 422, user node 212 sends an access request to its default gateway, e.g., gateway 206. The default gateway selects an access gateway based on gateway status data 241; the default gateway sends a flow request to the selected access gateway. The flow request may be for the access gateway to reserve bandwidth for requesting user node 212.

The flow request may be accepted or rejected. If it is rejected at 424, then process 300 returns to 422 and the default gateway selects a different access gateway. Once a flow request is accepted, default gateway 206 directs requesting user node 212 to use the selected access gateway for Internet access at 425. At 430, requesting user node 212 accesses the Internet via the access gateway.

In other examples, some gateways may be supplied power by a utility while others rely on battery power. In such a scenario, the load-balancing mode criterion would be less reliant on battery power data, but might favor gateways without battery issues. Different gateway systems can differ in the number of included gateways. This can affect the size of the gateway status messages; the size of the messages can affect the amount of power used to transmit the messages in proactive mode. The power required to send messages in proactive mode can affect the load-balancing mode decision. For a gateway system in which gateways are spread over a relatively large geographic area, a default gateway in reactive mode can weight load-balance-mode decisions in favor of nearby gateways (which are more likely to provide a strong signal to the requesting user node) than more remote gateways.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to a system including non-transitory tangible material in or on which information is or can be encoded so as to be readable by a computer. "Display medium" and "display media" refer to storage media in which information is encoded in human readable form.

Herein, "machine", "device", and "computer" refer to hardware or a combination of hardware and software. A "virtual" machine, device or computer is a software analog or representation of a machine, device, or server, respectively, and not a "real" machine, device, or computer. A "server" is a real (hardware or combination of hardware and software) or virtual computer that provides services to computers. Herein, unless otherwise apparent from context, a functionally defined component (e.g., a mode selector, a mode manager, a load monitor) of a gateway or other computer is a combination of hardware and software executing on that hardware to provide the defined functionality. However, in the context of code encoded on computer-readable storage media, a functionally-defined component can refer to software.

Herein, a computer is a machine having co-located or distributed components including computer-readable storage media, a processor, and one or more communications devices. The media stores or is configured to store code representing data including computer-executable instructions. The processor, which can include one or more central-processing units (CPUs), reads and manipulates data in accordance with the instructions. "Communication(s) device(s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, a "node" encompasses real and virtual devices.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis in the claims; "the" refers to elements for which there is implicit antecedent basis in the claims; for example, the phases "the center of said circle" indicates that the claims provide explicit antecedent basis for "circle", which also provides as implicit antecedent basis for "center" since every circle contains exactly one center. The illustrated and other described examples, as well as modifications thereto and variations thereupon are within the scope of the following claims.

The invention claimed is:

1. A process comprising:
a gateway system determining whether light-load conditions or heavy-load conditions exist in a gateway system according to a predetermined criterion; the gateway system comprising a number of gateways;
if light-load conditions exist, said gateway system operating a gateway in a reactive mode; and
if heavy-load conditions exist, said gateway system operating said gateway in a proactive mode;
in which, when a first gateway among the number of gateways receives a request for bandwidth access from a node, the first gateway secures bandwidth for the node before notifying the node that access has been granted.

2. A process as recited in claim 1 wherein, in said proactive mode, said gateway sends messages to user nodes indicating an availability of said gateway to handle traffic.

3. A process as recited in claim 1 wherein, when said gateway system is in said reactive mode, when a receiving gateway receives a request from a user node for network access, said receiving gateway selects an access gateway for providing said access.

4. A process as recited in claim 1 wherein said criterion takes battery status data into account.

5. A process as recited in claim 4 wherein a gateway manager consolidates gateway status data including load data and battery status data to yield comparative gateway status data.

6. A system comprising a gateway for providing network access to user nodes, said gateway having:
a mode selector configured to select proactive load-balancing mode or a reactive load-balancing mode based on whether load conditions are heavy or light according to a predetermined criterion;
a proactive mode manager configured to operate said gateway in a proactive mode in the event said mode selector determines load conditions are heavy, said gateway broadcasting gateway status data to user nodes in said proactive mode; and
a reactive mode manager configured to operate said gateway in a reactive mode in the event said mode selector determines load conditions are light, said gateway, upon receiving an access request from a user node, selecting an access gateway for providing network access to said user node;
in which, during said reactive mode, said gateway reserves access to the gateway before notifying the user node that access has been granted by reserving bandwidth at the gateway.

7. A system as recited in claim 6 wherein said gateway further comprises a load monitor for monitoring a load on said gateway so as to generate local gateway status data including local load data.

8. A system as recited in claim 7 further comprising a gateway manager for consolidating local gateway status data from plural gateways to yield comparative gateway status data for use by said mode selector in making load-balancing decisions.

9. A system as recited in claim 7 wherein said proactive mode manager transmits said local load data or data derived from said local load data to user nodes when said load conditions are heavy.

10. A system as recited in claim 7 wherein said gateway further comprises a battery monitor for providing local battery status data, said criterion taking battery status data into account.

11. A system comprising non-transitory computer-readable storage media encoded with a browser configured to, when executed by a processor:
    in response to a user command from a user node to access a network, determine whether a bandwidth availability message has been received from a number of gateways;
    if so, select a gateway from among the number of gateways from which to request access to said network; and
    if not, transmit a request to a predetermined default gateway, and
    in response to a response to said request indicating a selected gateway, accessing said network through said selected gateway;
    in which selecting a gateway form among the number of gateways from which to request access to said network comprises reserving bandwidth at that gateway before notifying the user node.

12. A system as recited in claim 11 further comprising said processor.

13. A system as recited in claim 11 wherein said selected gateway is different from said default gateway.

14. A system as recited in claim 13 wherein said default gateway selects said selected gateway.

15. A system as recited in claim 11 wherein the selecting of a gateway from among the number of gateways is based in part on gateway availability and remaining battery power as quantified in a message from each of the number of gateways.

\* \* \* \* \*

UNITED STATES PATENT AND TRADEMARK OFFICE
CERTIFICATE OF CORRECTION

PATENT NO. : 8,780,730 B2  
APPLICATION NO. : 13/098491  
DATED : July 15, 2014  
INVENTOR(S) : Saigopal Thota et al.

Page 1 of 1

It is certified that error appears in the above-identified patent and that said Letters Patent is hereby corrected as shown below:

In the Claims

In column 8, line 6, in Claim 11, delete "form" and insert -- from --, therefor.

Signed and Sealed this  
Eleventh Day of November, 2014

Michelle K. Lee  
*Deputy Director of the United States Patent and Trademark Office*